US011882800B2

United States Patent
Gergek

(10) Patent No.: US 11,882,800 B2
(45) Date of Patent: Jan. 30, 2024

(54) PROGRAMMABLE BUCKET AND METHOD OF USE AND MANUFACTURE

(71) Applicant: Franc Gergek, Quebec (CA)

(72) Inventor: Franc Gergek, Quebec (CA)

( * ) Notice: Subject to any disclaimer, the term of this patent is extended or adjusted under 35 U.S.C. 154(b) by 0 days.

(21) Appl. No.: 17/853,301

(22) Filed: Jun. 29, 2022

(65) Prior Publication Data
US 2024/0000027 A1    Jan. 4, 2024

(51) Int. Cl.
*A01G 25/14* (2006.01)
*A01G 25/16* (2006.01)

(52) U.S. Cl.
CPC ......... *A01G 25/145* (2013.01); *A01G 25/162* (2013.01)

(58) Field of Classification Search
CPC ............................ A01G 25/145; A01G 25/162
See application file for complete search history.

(56) References Cited

U.S. PATENT DOCUMENTS

| | | | |
|---|---|---|---|
| 3,753,315 A | 8/1973 | Adam | |
| 3,990,179 A | 11/1976 | Johnson | |
| 4,062,491 A * | 12/1977 | von Skwarski | A01G 25/162 239/66 |
| 4,083,147 A | 4/1978 | Garrick | |
| 4,102,081 A | 7/1978 | Morrow | |
| 4,267,972 A * | 5/1981 | Bryant | A01G 25/162 239/536 |
| 4,787,560 A * | 11/1988 | DeYoreo | B05B 9/0816 239/374 |
| 4,885,870 A | 12/1989 | Fong | |
| 4,993,186 A | 2/1991 | Immonen | |
| 5,427,748 A * | 6/1995 | Wiedrich | B01J 8/0492 210/97 |
| 5,446,994 A | 9/1995 | Chou | |
| 5,525,505 A * | 6/1996 | Young | A01H 4/005 47/60 |
| 5,782,035 A | 7/1998 | Locke | |

(Continued)

FOREIGN PATENT DOCUMENTS

| | | |
|---|---|---|
| DE | 2537135 A1 | 2/1977 |
| FR | 2841093 A1 | 12/2003 |
| JP | 2009005702 A | 1/2009 |

OTHER PUBLICATIONS

Anton Lebar of the Canadian Intellectual Property Office, International Search Report in PCT/IB2023/056722, dated Oct. 25, 2023.

*Primary Examiner* — Donnell A Long
(74) *Attorney, Agent, or Firm* — Cherskov Flaynik Gurda, LLC

(57) ABSTRACT

A device and method of watering plants using a programmable bucket is described. In one version, the programmable bucket uses a reservoir for water, a pump, at least one minimum pressure valve, a control enclosure, a water level switch, a flow meter, a watering hose, and a cover with an opening adapted to facilitate filling of the reservoir with a funnel and a removable plug. In use, power to the control enclosure is turned on and the reservoir is filled with water, setting the calibrated amount of water. The watering hose is removed from a recycling adaptor, the pump is activated through use of pushbuttons on the control enclosure, water fills the watering hose, once it reaches a minimum pressure valve water exits the hose under pressure, a signal from flow meter changes a volume of water in reservoir.

21 Claims, 15 Drawing Sheets

(56) References Cited

U.S. PATENT DOCUMENTS

| | | | |
|---|---|---|---|
| 5,829,193 | A | 11/1998 | Otake |
| 6,276,090 | B1 | 8/2001 | Lai |
| 6,363,658 | B1 | 4/2002 | Lai |
| 6,418,664 | B1 | 7/2002 | Shaw |
| 6,568,425 | B2 | 5/2003 | Gergek |
| 6,729,070 | B1 | 5/2004 | Locke |
| 8,065,834 | B2 | 11/2011 | Eckert |
| 8,146,292 | B2 | 4/2012 | Brandstatter |
| 8,485,796 | B2 * | 7/2013 | Gilpatrick ............. B05B 12/085 417/313 |
| 9,009,885 | B2 | 4/2015 | Faasse |
| 9,930,840 | B1 | 4/2018 | Gergek |
| 10,398,098 | B2 | 9/2019 | Gergek |
| 2003/0080161 | A1 | 5/2003 | Burger |
| 2007/0131790 | A1 * | 6/2007 | Wu ...................... A01G 25/145 239/525 |
| 2013/0291435 | A1 | 11/2013 | Gettig |
| 2015/0096228 | A1 | 4/2015 | Watson |
| 2016/0242369 | A1 | 8/2016 | Caceres |

\* cited by examiner

Cross section of minimum pressure two way valve

Cross section of one way valve used as of minimum pressure one way valve

PROGRAMMABLE BUCKET AND METHOD OF USE AND MANUFACTURE

BACKGROUND OF THE INVENTION

1. Field of the Invention

This disclosure relates generally to a fluid dispensing container which is subject to electronic control. In one embodiment, the container is a programmable bucket.

2. Background of the Invention

Search for better technology for taking care of indoor plants by the inventor goes back nearly five decades (to around 1974). Being familiar with problems of over-watering and spilling the inventor first proposed partitioning a flowerpot into upper part holding the soil with the plant and lower part being water reservoir. Water adsorbing ceramic spikes would be placed through the divider to keep the soil moist. A pipe would be placed through divider to remove the excess water through manual hand held pump.

Work on house plant technology resumed two decades later (around 1993) while trying to decorate inventor's home (north of Toronto). Two types of flowerpots were created. The first one was created on base of work twenty years earlier. Better larger buckets made of fiberglass were selected. Partitions were made out of solid plastic sheet to fit the walls of the bucket at about ⅓ of the height. Two sizes of holes were machined through the partitions. Through the larger hole a 1" pipe was placed from top to the bottom. Through smaller holes pieces of ropes (wicks) were places to transfer water from the bottom of the flowerpot to the soil. The second type of flowerpots was the combination of larger bucket or flowerpot and the planter—container. It was real struggle to find flowerpots and planters that would fit together. Holes were also drilled through the bottom of planter through which wicks were placed. The 1" pipe was placed through the larger hole at the bottom of container or the pipe was squeezed between the solid flowerpot and softer container. At that time also modular flower boxes made out of Plexiglas were developed with dividers to spread out the plants. The first experiments were made using cumbersome flexible impeller pump attached to the hand drill.

At that time, remotely controlled watering system was developed by the inventor using reversible flexible impeller pumps. A portable unit was also made using a carry on suitcase with a built in tank. Both units were able to deliver water at adjustable speed, but there was no any means to measure and display of the amount of water. Units were also able to suck water back. The system was used for number of years very successfully at the inventor's home. It was patented in U.S. Pat. No. 6,568,425.

These prior approaches garnered interest, especially the portable watering unit adapted to take care of plants in commercial offices.

The inventor authored the book "Low Maintenance House Plant Decoration without Spills and Over Watering" which summarized the learned lessons from the practically used system.

3D printing has made it possible to create new prototypes on an accelerated timeframe. The inventor has worked on new types of flowerpots and planters that would fit together and that could be used with his watering method of removing excess water through a reversible pump. The design started under plan where future indoor plant decoration should be created with well-made free standing and hanging flowerpots as well flower boxes that could become fixtures as furniture. They would have installed valve installed at maximum water level. The plants are grown and sold in inexpensive planters. Wicks would be inserted into soil in the planters through holes in the bottom. Water would then be supplied through quick attach connector. The flower pots include radio connection from flowerpot and the remotely controlled low pressure water supply, in one embodiment. This approach was explained in the inventor's patents, such as U.S. Pat. No. 9,930,840 issued at Apr. 3, 2018 and U.S. Pat. No. 10,398,098 issued on Sep. 3, 2019.

The last two patents are mainly concerned with flowerpots and flower boxes that could be watered from a low pressure device through quick attach connector. All those flowerpots and flower boxes required electronic controller inside of the vessel that would monitor the water level and would send signal to water supply when to turn off the water.

The details of the low pressure water supply were not explained as inventions were mainly concerned with design of the flowerpots and flowerboxes.

The inventor standardized the hanging and freestanding flowerpots and fitting planters of four different sizes: small, medium, large and extra the large. Sizes are incremented in volume at 40%. For example, a medium freestanding container has 40% larger volume then small container. Standardization makes a lot of sense, but as in any other field often takes long time to get implemented.

The inventor has seen success with prototypes of modular flowerboxes. Especially smaller flowerboxes with 4" planters for fresh spices (herbs) and 5" for orchids, violets, and other plants. Taking care of small plants is particularly problematic since the small amount of soil holds very little moisture and they have to be watered frequently for the plants to thrive. The flowerboxes are different shapes holding 2, 3, or 4 planters. Besides the flowerboxes made of plastic, new type of flowerboxes was developed where the base and the top rim of the flowerbox were still made of plastic but the walls are made of stainless steel.

While prototypes were created and accepted for potential funding, COVID-19 hit. As many other commercial activities around the world, the inventor's commercial plans were also shelved. Instead of continuing on the modular efforts, the inventor decided to use the break to develop the low pressure watering system. What follows is the result of that work.

A need exists in the art for a system that can simplify watering. A need also exists for a system and method to dispense fluid, such as water, using low pressure systems. The system and method should allow for controlled watering of sensitive plants.

SUMMARY OF INVENTION

An object of the present invention is to provide a device and method for watering of plants that overcomes the drawbacks of the state of the art.

Another object of the invention is to provide a system and method that could supply water at low pressure and would have possibility to control the flow through remote control. A feature of this invention is that it uses low pressure connections to provide controlled amounts of water to plants. A benefit of the invention is that it maintains the correct moisture level.

Still another object of the invention is to provide a device which provides feedback to the end user. A feature of the invention is that system includes an app for tracking of water and moisture level. A benefit of the invention is that status of plants can be monitored continuously and adjustments can be made remotely.

Briefly, a watering device is provided, which uses a programmable bucket comprising a reservoir for water having sidewalls and a bottom, a pump, at least one minimum pressure valve, a control enclosure having a buzzer and control buttons, a water level switch which is adapted to activate the buzzer in the control enclosure, a flow meter, a watering hose adapted to be removably received by a recycling adaptor and wherein a rate of water exiting the watering hose is controlled by the control enclosure and flow meter, a cover with an opening adapted to facilitate filling of the reservoir with a funnel and a removable plug.

Also provided is a method for watering plants is provided, the method uses a a programmable bucket and includes: providing a programmable bucket having a reservoir for water having sidewalls and a bottom; a pump; at least one minimum pressure valve; a control enclosure; a water level switch; a flow meter; a watering hose; a cover with an opening adapted to facilitate filling of the reservoir with a funnel and a removable plug. In use, power to the control enclosure is turned on; wherein when the reservoir receives the water, the water level switch is activated, the control enclosure activates a buzzer, flow of the water into reservoir is stopped, an amount of water is set to a calibrated value and is displayed on the control enclosure; wherein the watering hose is removed from a recycling adaptor, the pump is activated through use of pushbuttons on the control enclosure, water fills the watering hose, once it reaches a minimum pressure valve water exits the hose under pressure, air is entering reservoir through the opening at a bottom of the recycling adaptor, signal from flow meter changes a volume of water in reservoir; wherein the pump is stopped through use of pushbuttons, watering hose is full of water but does not exit the watering hose, however, if a dispensing end of the watering hose is dropped below a certain level or if it accelerated, swung very fast, water would leak through the dispensing end of the watering hose, for this reason the dispensing end of the watering hose is placed into recycling adaptor to prevent spilling; wherein through use of pushbuttons pump is activated with the dispensing end of the watering hose in recycling adaptor, water re-enters the reservoir through the opening at the end of recycling adaptor, signal from flow meter is ignored as the volume in the reservoir does not change; wherein the amount of water is entered into control enclosure memory as a program, the watering hose is removed from recycling adaptor, program is selected and pump is activated, a programmed amount of water exits the watering hose, then stops; and wherein an end of the hose is placed into the said recycling adaptor to close an opening in the cover at the bottom of the recycling adaptor.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1:
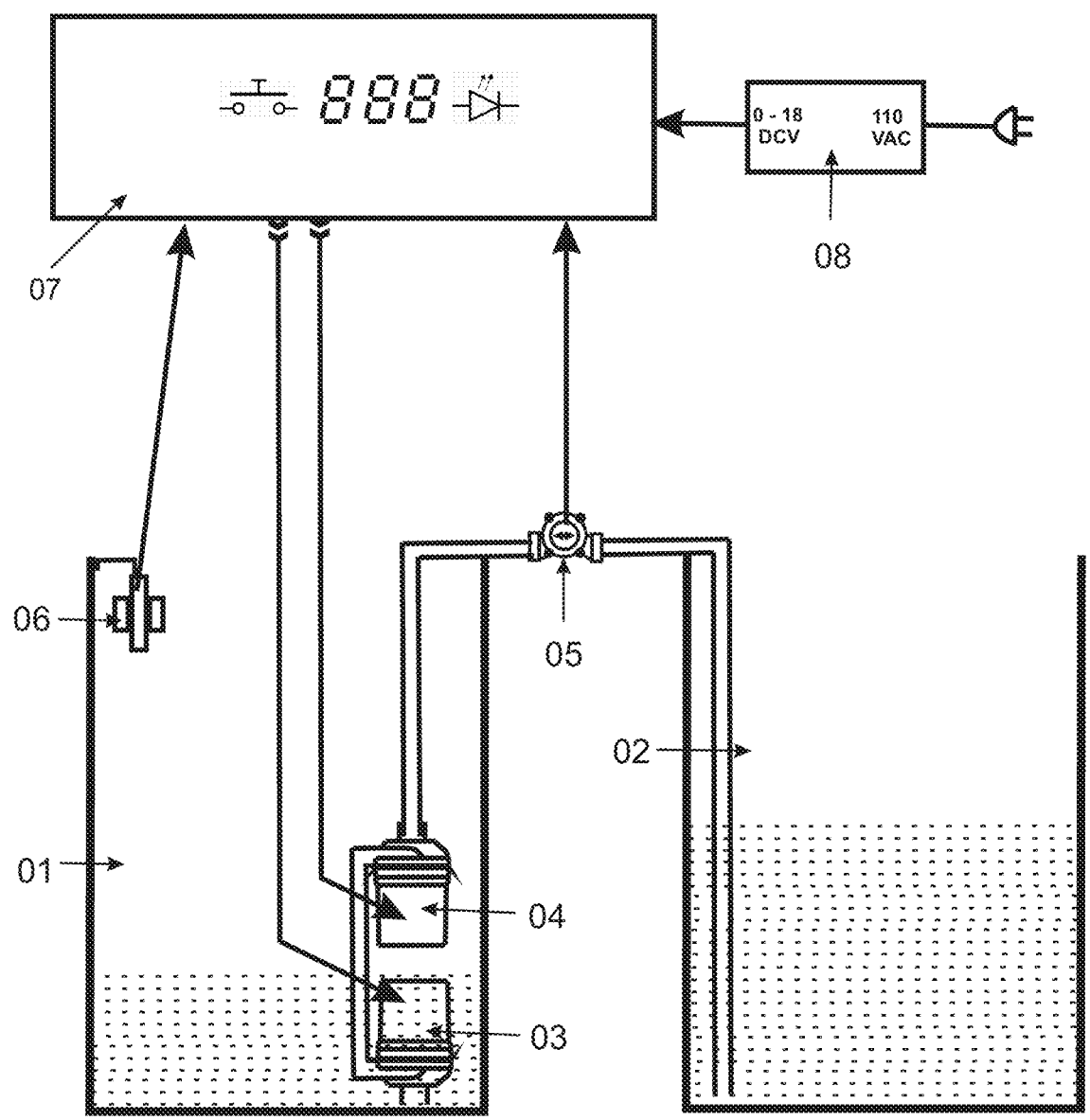
FIG. 1 depicts a testing and evaluation setup of the elements for the system, pursuant to one embodiment of the invention.

The foregoing summary, as well as the following detailed description of certain embodiments of the present invention, will be better understood when read in conjunction with the appended drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Pump Overview

Flexible impeller pumps are known in the art, but because of the friction between the body of the pump and the flexible impeller they require significantly more power than it would be required just for moving water. This would reduce the time pump can run under battery power. Reversing the flow required bending of impeller's fins again requiring significantly higher current. This sudden current surge was not desirable as it would require higher-rated and more expensive devices. The other potential problem was the flow direction measurements. As it was planned that direction of flow would be simply following polarity of the voltage on the pump motor. Such erratic pump behavior could not guarantee good results. Another problem with flexible impeller pumps is durability. If the flow direction changes very frequently, the impeller will break along the bend no matter what material they are made off. These pumps cannot run dry for long as the friction of flexible impeller and the body of the pump overheats and damages the impeller.

Another type of pumps has been widely available for maintaining the aquariums: the small submersible centrifugal pumps. These pumps are inexpensive, very reliable, and very quiet and they are submersible. They can also run dry since there is no contact between the hard fins of the pump and the body of the pump. Operations of these pumps were tested first at nominal pump's voltage. However, the flow water and the lift were not sufficient. When used only for short periods of time, the operational voltage could be easily increased. When voltage was increased by about 25% performance became satisfactory. To create suction with centrifugal pumps one needs two pumps to prime the pumps. A first pump is engaged for short time to push air out of the hose and fill it with water. If the end of the hose is placed into water and then second pump is engaged the second pump will create the suction regardless if the end of the hose is above or below the pumps (reasonable height). It may sound strange but it does work this way. To make such setup workable you would have to initially add small amount of water into the bucket and during the operation system should not allow to completely drain the bucket by controlling the water level.

A design requirement for the portable unit is that the entire be filled through the pump without placing the unit inside of the sink which would require the user to lift the unit into the sink and then lift it from the sink and place it on the floor. It would severely limit the size of the unit. Since the centrifugal pumps can only push liquid one way it became obvious that two pumps would be needed. With experimenting it was established they can be connected in series with one pump pushing water one way and the other pump the opposite way. The unit employs a water level switch that would stop supply when unit full.

Testing Setup

Turning to FIG. 1, to do the further testing two 8 L buckets were used. The main bucket 10 had two pumps connected in series. Intake of the first pump 1 was placed to the floor of the first bucket 3. The output of the first pump 1 was connected to the output of the second pump 2. A hose was attached to the input of the second pump 10. This hose 10 was then connected to the flow meter 5. A flow meter hose 9 was attached to the other side of flow meter and was placed into second bucket held by a clamp attached to the top rim, with the end of the hose placed to the bottom of the bucket. This setup was then used for developing the hardware and software and evaluating the whole system. It was extremely practical as most programs were for flows from main bucket into secondary bucket. When the secondary bucket was full the flow was reversed until stopped by water level switch in main bucket.

To deliver water in desired amount the flow meter 5 was added. Flow meters on market have been designed for flow in one direction. The flow meters are designed with port directing flow over the fins of turbine of the flow meter through a narrow aperture. This way, the speed of the flow is increased so that meter can work more reliably at lower flows. This hole was opened so that both entries to the meter were the same. The flow meter still worked very reliably both ways but it was kept in mind that the flow should always be kept above certain minimum value.

Figure 2:
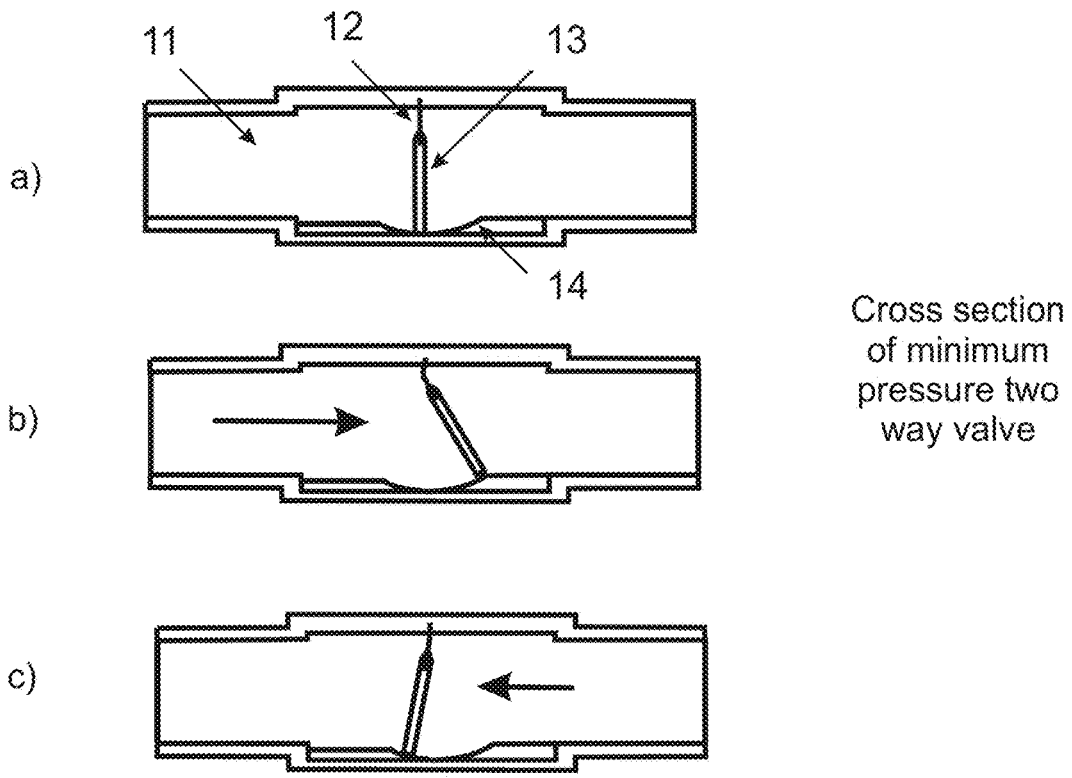
FIG. 2A-C depicts a cross section of a minimum pressure two-way valve.

Inventor accepted the use of submersible pumps because of its simplicity for the use of the system for watering house plants but for other applications like use for drinkable water or wine storage it could be installed outside of the bucket in a bay with cover. The outside wall of the bucket 3 would be modified to hold a semicircular bay 9 as shown on FIG. 2. The pump 1 would be placed inside this bay. The bottom of the bucket is modified to be shaped under angle with the lowest point close to the pump. The bottom outside rim of the bucket has to be extended. A pipe with right angles at each side is connected to the bottom first pump to the hole in the floor in the bucket.

Next, the hardware and the software were developed to control the flow (in steps 1 to 9) for the flow out of the bucket and similar flow rate control into the bucket (also in steps 1 to 9). Next came displaying of the water volume in the bucket. The calibration is always done on transition from over full to bellow the top switch. As the flow rate factor was different for the flow out of the bucket and flow into the bucket software was developed for automatic adjustment of return flow rate factor. Next was displaying the water volume in the bucket. Because of limited power and speed of the controller it was decided that volume of water in the bucket would not be displayed when value changes fast but only when pumps stop. During the high speed of pumps only the flow rate is shown.

Next, was the entering the volume into display and then delivering that amount. Once this feature worked then software was developed to enter four different amounts into four different programs. Everything functioned within expected parameters and used components known for long-term reliability. However, once the unit was taken out of the testing setup, the liquid did not stay in the hose. Although the inventor noticed the problem of water siphoning, migrating at slow rates between two buckets he wanted to make the system operational first. For a while inventor tinkered with idea of installing powered valve. He did not like it as it would require power down sequence to remove water from hose before removing the power. Eventually the inventor realized that the system will need minimum pressure valve that would allow the flow only if the pressure in the hose is more than minimal value (e.g. 1 m of water requiring approximately 10 kpa) right at the end of the hose.

Two-Way Minimum Pressure Valve

Inventor proposed two way minimum pressure valves as shown in FIGS. 2a, 2b, 2c. It consists of square tube with a flap 13 and spring 12. Under water pressure from the left (FIG. 2b) the flap would deflect to the right. After reaching a threshold value, the water would flow freely from left to right. Valve similarly under water pressure from right to left (FIG. 2c). As manufacturing such valve would require very precise and expensive machining, the testing is done by separating flows: 1. to out of the main bucket and 2. into the main bucket. This would be done by using two one way valves. One way valve was attached to the hose. As the pump was activated the flow out of the hose was normal. But as the pump was stopped the flow also stopped. When the pump was activated flow resumed, then stopped when pump was turned off.

This response was something that was not anticipated.

Figure 3:
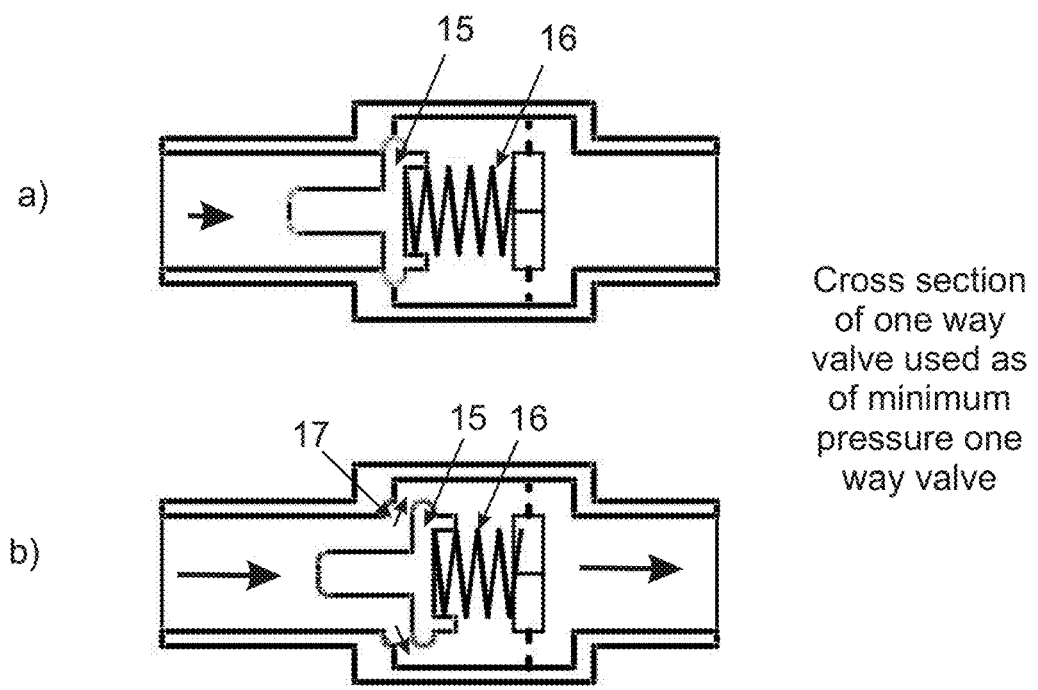
FIG. 3A-B depicts a cross-section of a one way minimum pressure valve.
Figure 4:
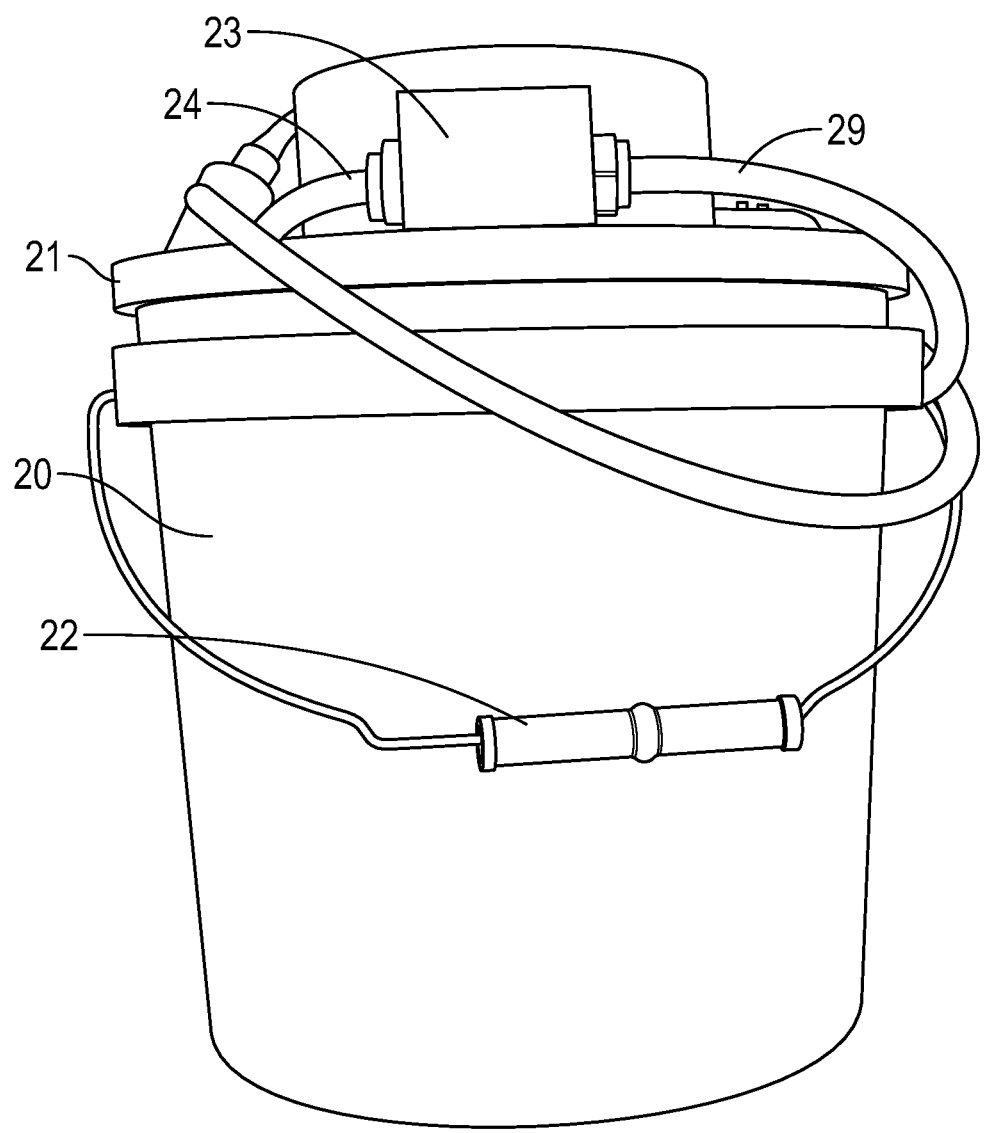
FIGS. 4 to 9 depict a first embodiment of the invention.

Also water was still on the inside of the hose and the valve, water did not leak out. This feature of one way valve is not specified on device characteristics. This simple solution makes the system much more practical. Cross section of one way valve is shown on FIG. 3a and FIG. 3b. Under higher pressure, the flap 15 supported by the spring 16 is pushed to the right so that water can run through the valve 17. It was at that point that the inventor took another look at the works that he has done. Number of previously desired features were dropped or changed. The valve in this application is referred to as a one-way minimum pressure valve; a valve that allows flow one-way only if pressure is above a minimum value. One-way valves that have very low minimum value pressure could not be used in these applications although they could still perform well as one way valve.

A two way minimum pressure valve is constructed by combining two one-way valves in same body but each having a flow opposite direction.

Portable Example Embodiment

Shown in FIG. 4 to FIG. 9 is an example embodiment using the above-concepts. The embodiment shown herein is an example product using a watering system with one pump, with flow in one direction and one-way minimum low pressure valve at the end of the hose.

This embodiment can be referred to as the Gergek Waterer. It is designed to be a small portable unit with opening on the top for manual fill up, that would fit into kitchen or laundry sink for watering houseplants in homes, offices and other locations where a sink is available.

As shown in FIGS. 4 to 9, the Gergek Waterer uses the following parts a smaller bucket 20, a cover 21 and a carrying handle 22. The device includes a flow meter 23, a house from the pump output to the flow meter 24 and the low pressure valve 25. Also included is a recycling adaptor 26 and a remote control 27. Further, a watering handle 28 and the watering hose 29 are provided. Finally, the device includes a funnel 30, a plug 31, a control enclosure 32, a recycling switch and sensor 33, a water level switch 34, the pump 35 and a mounting bracket 36. The control enclosure 32 contains electronic and analog circuits necessary to control and operate the various components of the system. For example, the control enclosure 32 includes a circuit board which will detect button pushes either on the remote or on the control enclosure 32. The operation of the system and remote are described fully below. In one embodiment, the control enclosure includes removable batteries or other power source, such as a power source which generates the power for the control of the system from the motion of water being provided to the system.

In use, the Gergek Waterer is smaller to fit into kitchen or laundry sink and lighter so it could be easily carried around. On a top portion, at one side, there is an opening with a funnel and removable plug. There is also overflow guide that directs water at the side of the bucket directly into sink in a case user does not close tap when bucket is full. The bucket it is placed into the sink and the plug on the top is removed. The end of the faucet is positioned over the funnel. The user turns on the power on the unit and opens the water at reasonable flow. When the water reaches the float switch the buzzer sounds. The float switch is positioned at about 80% of height of the bucket. The user stops water flow. If stopping is slow then the excess water will run down the overflow guide straight into the sink. To remove the excess water the bucket is tilted and the excess water is drained through the funnel. The display shows only FULL.

The plug is placed into the funnel and the bucket is lifted out of the sink and carried to the plant to be watered.

To use the bucket, the end of the hose is removed from the recycling adaptor at the top of the bucket. User points the end of the hose and presses the ON button. Water runs out of the end of the hose. Using + or – buttons the flow is increased or decreased. The display is replaced with line and last digit on display shows the flow rate (number from 1 to 9). To stop the flow, the user presses the OFF button. The flow stops and display shows the new value for the amount of water in the bucket.

At the top of the display there are PROGRAMS with four pushbuttons with LED lights underneath. If user presses the button 1 once the LED 1 turns on and number appears in display like 100 (which refers to 100 ml or 0.1 Liter). If user presses button 1 again the LED 1 turns off. Pressing other 2, 3 and 4 buttons would show numbers 200, 500, 800. The four numbers are programmed numbers for the amount of water that will be delivered if any of the programs is selected. These values can be changed, for example using the app described herein or using the interface. For example, display shows 4.000 and program 2 is selected and ON button is pressed the display shows only flow rate number that can now be adjusted. Once 200 ml of water is delivered the display will show new value 3.800.

For the simplicity of the unit the amount is set to calibrated value when the water level drops and float switch is deactivated. If ON button is used manually or with the programs the number in display will be updated once level drops below the float switch.

If the unit is turned on and the display shows a small number (meaning the bucket is nearly empty) and user only has to water, for example, two small plants it does not make sense to fill the bucket with 6 liters of water. User places unit into sink and adds some water which would be sufficient for a small use. He presses ADD button. A number 2.000 appears in display. This number can be changed using + or − buttons. He presses ADD again and the 2.000 will be added to the volume and the new value will appear in the display. All the programs and buttons will work properly. The only problem that may appear that user will run out of water if he underestimated the added amount.

After use, the end-user inserts the end of the hose into recycling adaptor. The bucket is now sealed and could be turned upside down and it should not leak. The end of the hose that is full of water is this way safely stowed. There is a switch/sensor in the adaptor. The ON and OFF buttons still work but the water re-enters the bucket through the hole in the cover at the end of the recycling adaptor and display does not change. There is dual purpose of using this adaptor. When hose is out of the adaptor the air can enter the bucket to compensate for volume of water that has been removed. The second function is to mix the water in the bucket. The RUN button works but the flow counter is bypassed as the amount of water in the bucket does not change. There are two potential uses of this feature. With the bucket full the user adds some liquid fertilizer. He then engages the recycling feature for a few minutes to make sure the fertilizer is properly mixed. The second use would be for cleaning the bucket. Diluted bleach is poured into the bucket. By pressing the RUN button pump is engaged. User moves bucket around to make sure all the walls are covered with cleaning solution. He then removes the hose and disposes the cleaning solution. He can repeat the same process with fresh water to rinse the unit. With the end of hose securely placed into recycling adaptor and plug is placed into the funnel the bucket is sealed.

The water hose used with these example embodiments is ¼ "ID and ⅜" OD clear vinyl. With 22 W pump motor can deliver about 4 L per minute. This amount is sufficient for watering indoor plants. Flow is controlled by circuit placed in enclosure at the top of the bucket. The circuit is protected from water from the top and from the sides, but it is not submersible. The compartment for the rechargeable battery is just below control and display circuit. Curved solar panel could be placed on the side of the cover. The four buttons on the top control the flow and the rate of the flow.

Remote Control

The flow control is duplicated on the remote control. Handle has been designed to accommodate the water hose and will be covered with a soft sleeve. The front of the handle has been designed to accept the remote control. The remote control is made with tactile features which allow it to be used without having to look at it. Symbols for ON and OFF button is largest and most conveniently positioned on the remote control. It can be easily identified by touch. Remote control can be used with pushbuttons on the top with thumb; or twisted around and controlled with index finger from bellow similarly to nozzle control on outdoor water device.

Many experiments were made to create a remote control that would operate all the functions of portable unit. It was after many failures to come up with something very simple and practical that was decided the remote control would be the handle to manage the flow at the end of the hose. The handle is the oval tube in cress section that can accommodate the watering hose that can slide back and forth. About one fifth of the handle is modified to accept the remote control. The remote control is similar to remote control for cars in size and works on the same frequency. The remote control can be also turned around to accommodate different users. The remote control has only four buttons which have embossed surface so that user can recognize them with looking. The buttons on the remote control are duplication of flow control on the main unit. They are symbols for ON, OFF and + (increase) and − (decrease) the flow. The handle can also be turned around so it could be operated by the index finger from underneath if desired.

In some embodiments the system includes a wireless network receiver and a corresponding application. In one embodiment, a Bluetooth radio is included along with a controller for a Wi-Fi connection. Through such connection app the unit could be easily programmed without changing and complicating the simplicity of the basic design that can appeal to large portion of ordinary users. In one deployment of the system all the plants in household are numbered or provided a different identifier. Each plant could have an assigned program which customizes watering.

Alternative Embodiment

Another embodiment is shown in FIGS. 10 to 13. This alternative embodiment is referred to as the Gergek Waterer Pro and uses a larger bucket with quick attach connector and electrical valve to fill up from high pressure water system and having handle attachment that can be pulled out and caster wheels for easy moving around for watering indoor plants in stores, garden nurseries, and other commercial environments.

The parts of the Gergek Waterer Pro include a hose from pump to flow meter 24, a minimum pressure valve 25 and the recycling adaptor 26. Also included are the remote control 27 installed removably in the watering handle 28. It includes a pump 35 a larger bucket 40, a cover for larger bucket 41, and multi-directional caster wheels 42 along with a larger handle 43 and a handle extension 44. Also included is a bracket to hold the handle extension in down position 45, a quick attach connector 46. The device includes a depiction of a hand pulling the bucket 47.

This is a larger bucket 40 with cover 41. It comes with caster wheels 42 and a handle 44 that can be extended for easy polling around garden nurseries, stores, offices, hotels by hand 47. In some embodiments, it includes an electric valve with quick attach connector 46. To fill it, the water hose is attached to the bucket and opens manual valve on the hose. The user turns ON the power 48 on the top of the control unit on the bucket. The user presses ADD button 49 on the top of the unit. The electric valve is turned ON and water is filling the unit. When full and top level switch is activated the electric valve is turned OFF and the buzzer sounds. User closes the supply hose and removes it from the bucket.

In many respects, the operation of the unit is identical to use of small portable unit.

Figure 14:
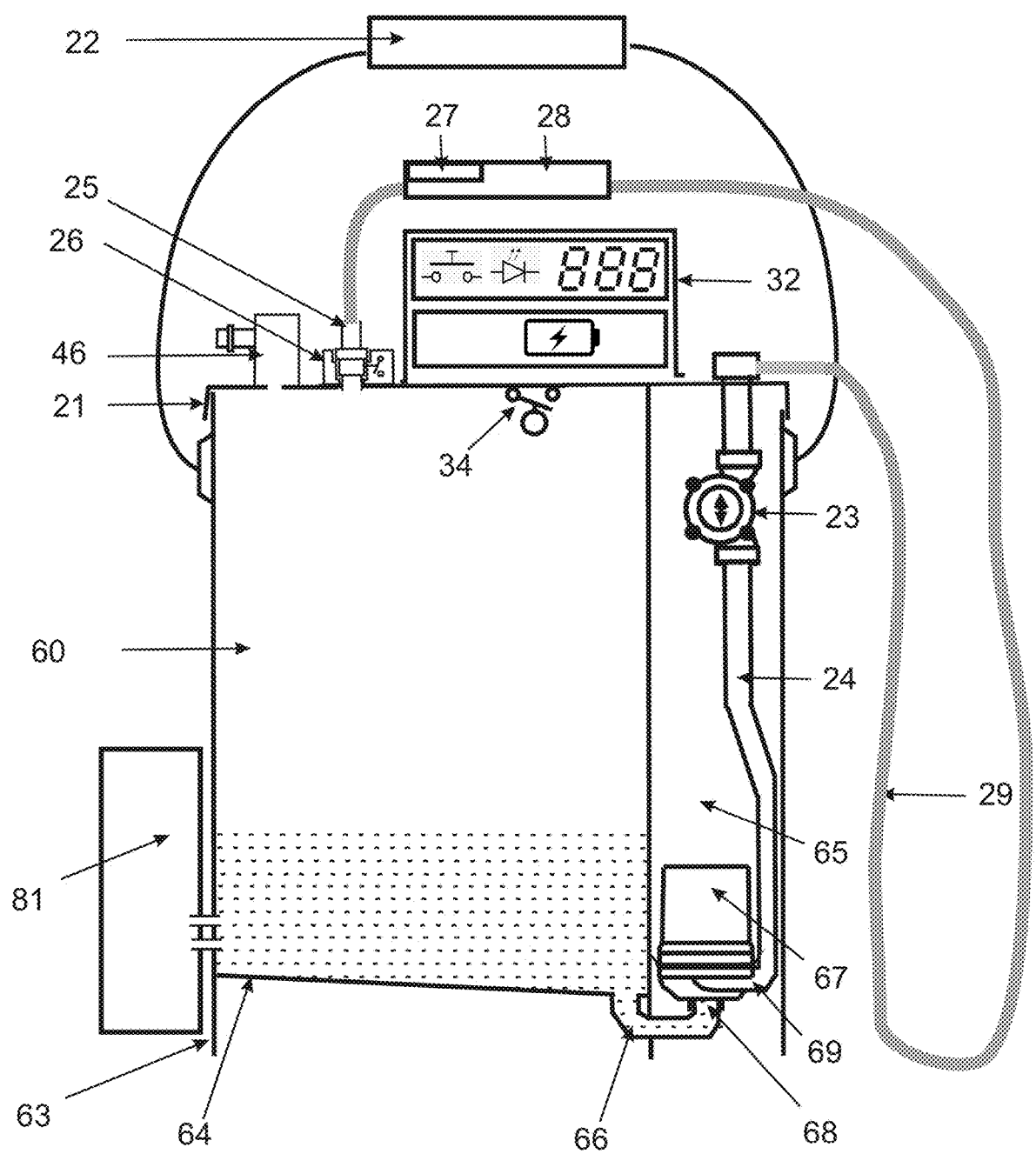
FIGS. 14 to 17 depict a further alternative embodiment of the invention.

Unlike the smaller unit where pump could be attached to a bracket 51 that is fixed to the cover in larger buckets it is easier to place couple of stainless steel rivets 50 to the wall of the bucket close to the bottom (shown in FIG. 14). The pump 53 is attached to stainless steel bracket 51 that is screwed to the rivets 50. The intake of the pump 54 is close to the bottom of the bucket 52. The output of the pump 55 goes to the input 36 of the flow meter 37 shown on FIG. 12.

Embodiment with Cooling

In another embodiment, a larger bucket is combined with a water cooling system, which is powered by solar panels or a solar umbrella, in various embodiments. This example embodiment can be referred to as a Gergek Cooler.

Figure 15:
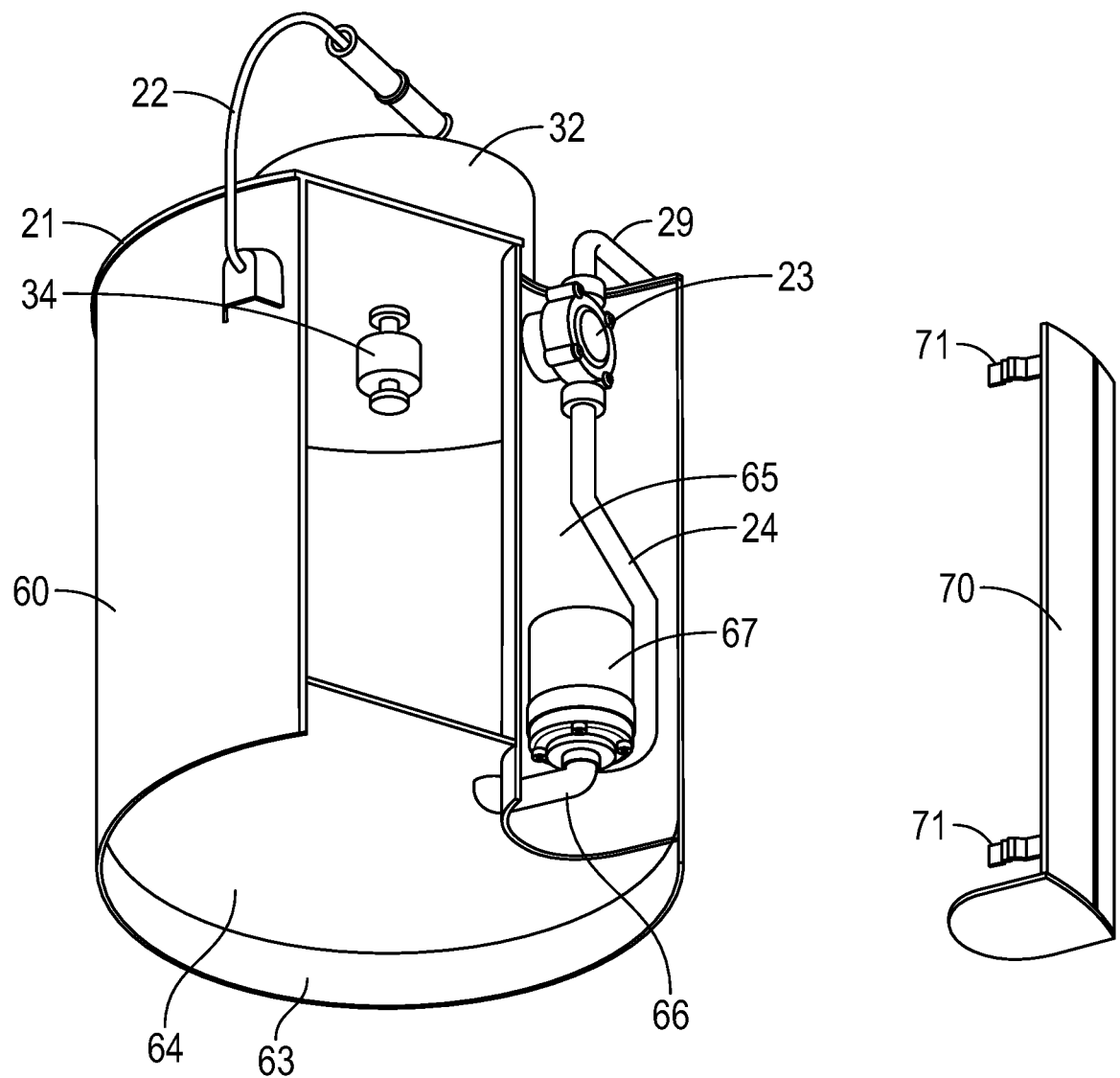

The Gergek Cooler is shown in FIGS. 14 and 15. The parts include a bucket cover 21, a handle 22. A hose 24 from the pump to the flow meter 23, a minimum pressure valve 25 as described herein, a recycling adaptor 26, a remote control 27, a watering handle 28, the watering hose 29. The embodiment also uses a control enclosure 32, a water level switch 34. For this embodiment a bucket with a bay 60 is used. The bucket 60 has a bottom 64 and a bay 65. There is also a pipe 66 connecting the bucket to the pump, the pump 67. For the cooling a Peltier Cooler Refrigerating System is used. The bay includes a cover 70 and retaining springs 71.

Although the programmable bucket was developed for taking care of houseplants it has number of features that are very suitable for holding and dispensing cold water with the added thermoelectric Peltier Cooler Refrigerating System. When deciding on use of Gergek programmable bucket the first thing you have to find out if you can use submersible pump inside of bucket or the pump has to be installed outside. For outside mounting, the bucket has to be modified as shown on FIG. 14 and FIG. 15. The bottom rim has to be wider. The bottom of the bucket should be under slight angle with lowest point closer to the pump. A pipe has to be installed between the lowest point in bucket to the pump intake. The rest could be the same as in other watering systems. Normally the end of the hose is plugged into the receptacle, as shown.

The bucket is larger as it does not need to be carried. In one embodiment, it has to be insulated from all sides to reduce cooling requirements. Also, in one embodiment, the end user provides their own thermos or water bottle that the vendor would fill with cold water. The thermoelectric Peltier Cooler Refrigeration System is installed at one side of the bucket close to the bottom. The intake of the pump is connected by a pipe through the hole at the bottom of floor of the bucket as shown in the figure. In this arrangement, the pump is below the floor of the bucket. The exit of the pump is connected to the optional filter and then to the flow meter. At the end of watering hose one way valve is installed. The end of the hose should be stuck into specially designed holes receptacle at the top of the bucket so that end of the hose should be pointed over the cooling element. The cooling circuit should be integrated with pump control to activate circulation by turning pump on but ignoring the flow meter as amount of water is not changed. External water temperature display should also be provided to attract the customers if the unit is used for sale of cold water. If there is potential customer the vendor would press recycling button to cool the hose. A small paper cup is filled with cold water from the bottom of the tank at slow flow rate, so that the hose and the water in it are cold. The vendor would then hand small paper cup to the potential customer and would press Button 1 (SAMPLE) that would deliver small amount of cold water into paper cup at very slow rate to avoid any spilling.

The vendor can regulate the flow rate from the remote control. As the water level rises the vendor slows the flow and then stops it. The display will now show the amount of water and then the sale amount. No plastic bottles, no plastic waste and business opportunity for many thousands of people all over the world.

Such buckets will also find use at homes in tropics all over the world providing cold water without need for electrical installation and no energy cost.

Addressing Sediment Collection

The various embodiments are designed to address a nagging problem with sediments in bucket with pumps. This problem occurs in other applications, such as for example in a aquarium. The inventor used to have large aquarium in his house with submersible pump to circulate water. After 4 to 6 weeks after replenishing water he found brown sediments in the gravel. He was sure that the sediments came from fish's excrements, and so he always cleaned it with the suction tube and refilled the tank with fresh water. Now, that he used the submersible pump in his testing setup he also found those brown sediments in bucket with the pumps. The source of the problems was, by his assumption, a component in the pumps, such as the strong permanent magnet motors driving the pumps. To test his assumption he moved the pumps to the outside of the buckets. After weeks using the new setup there has been no trace of the sediments. If the device is used strictly for watering the house plants those sediments could be ignored especially if there would be suggestion in guide to always empty the bucket after the use. It is not purpose of this disclosure to make decision on preference in design but rather to show different ways to implement his invention.

Figure 5:
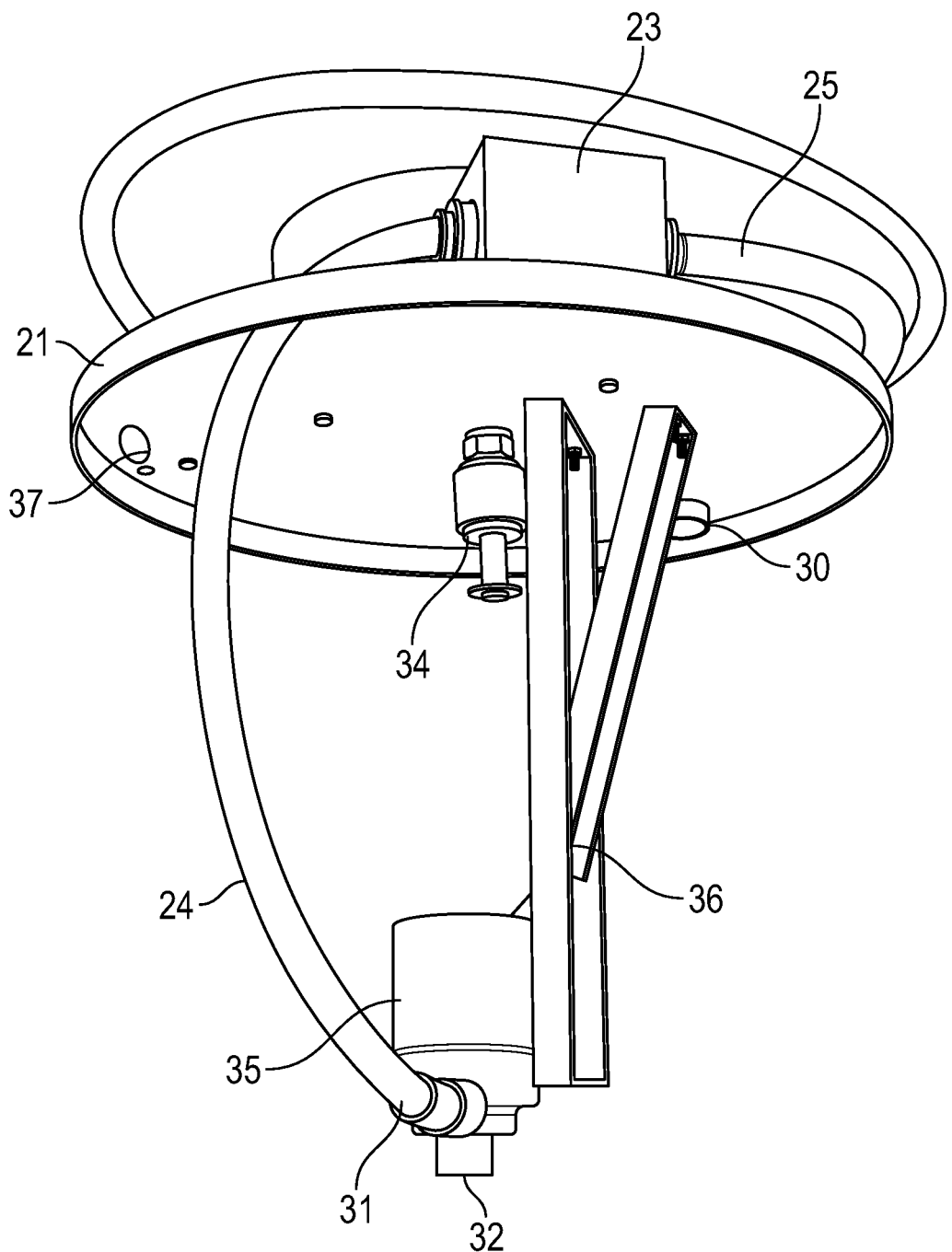
Figure 6:
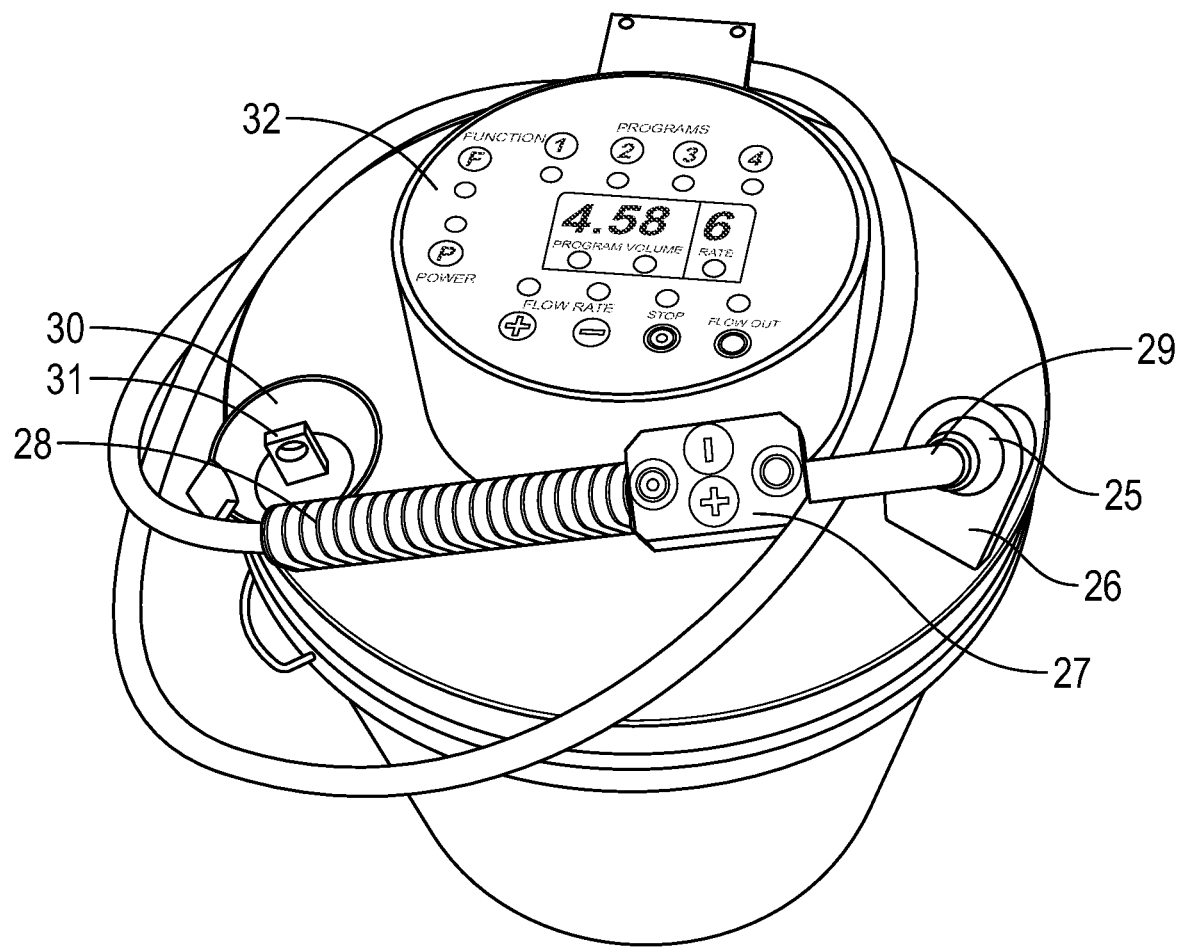
Figure 7:
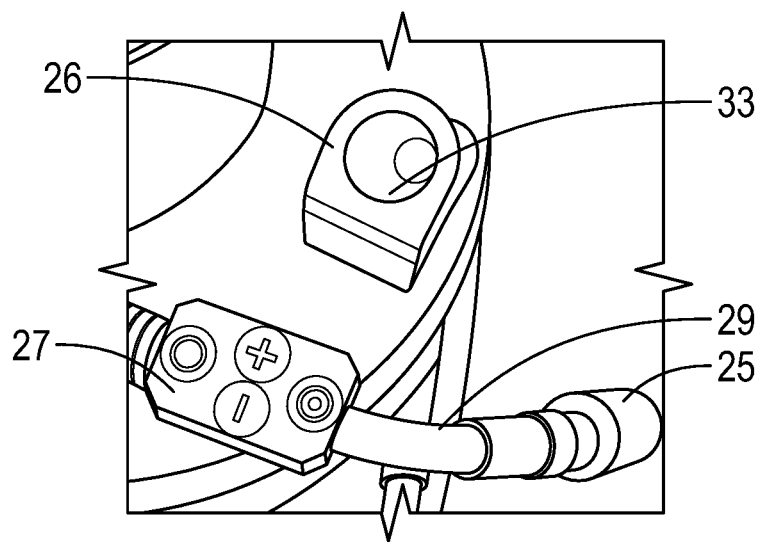
Figure 8:
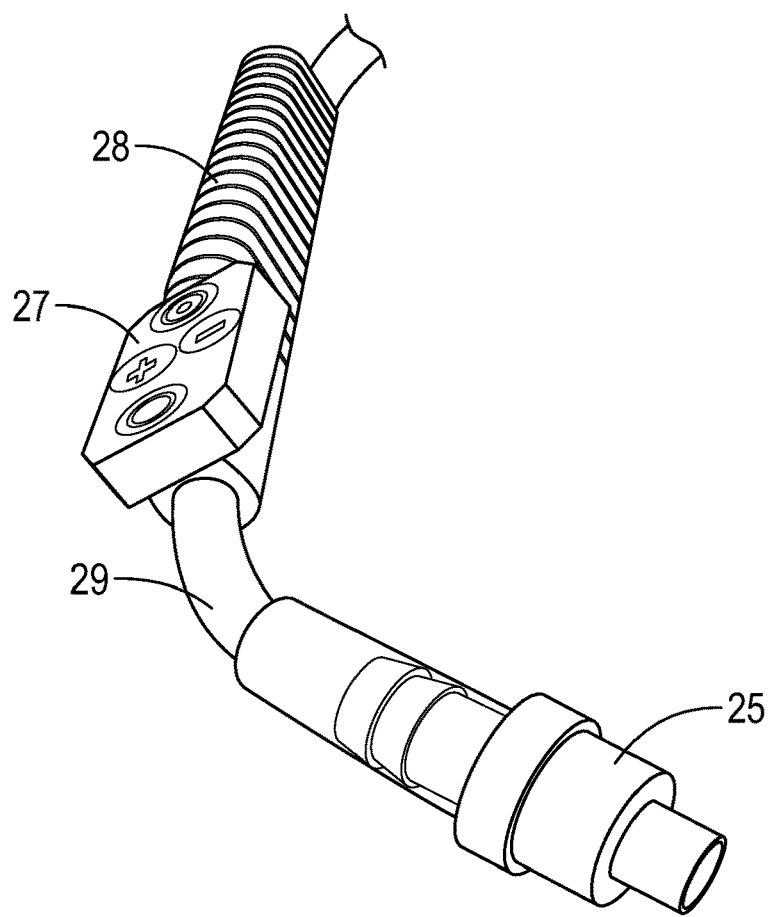
Figure 9:
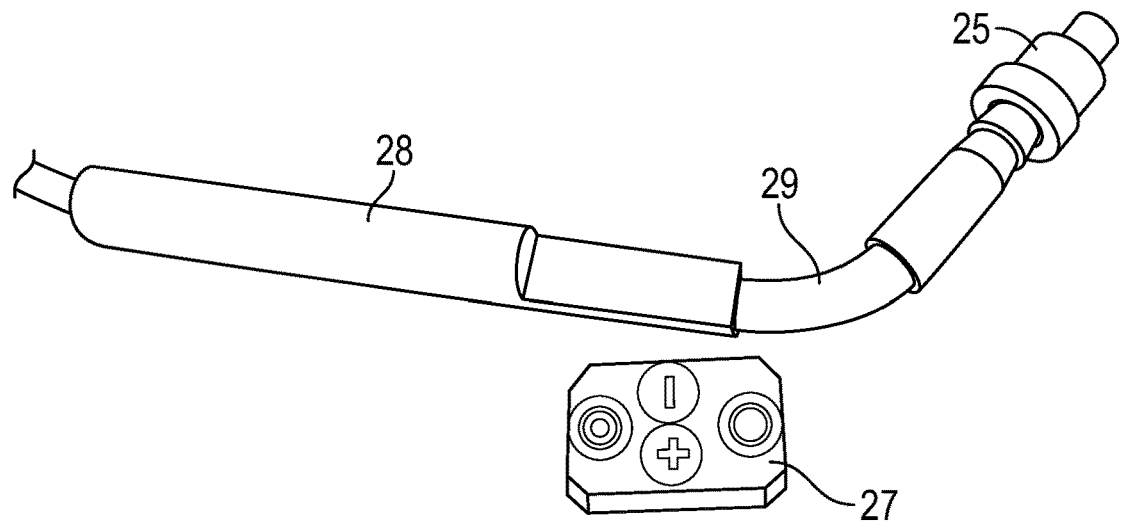
Figure 10:
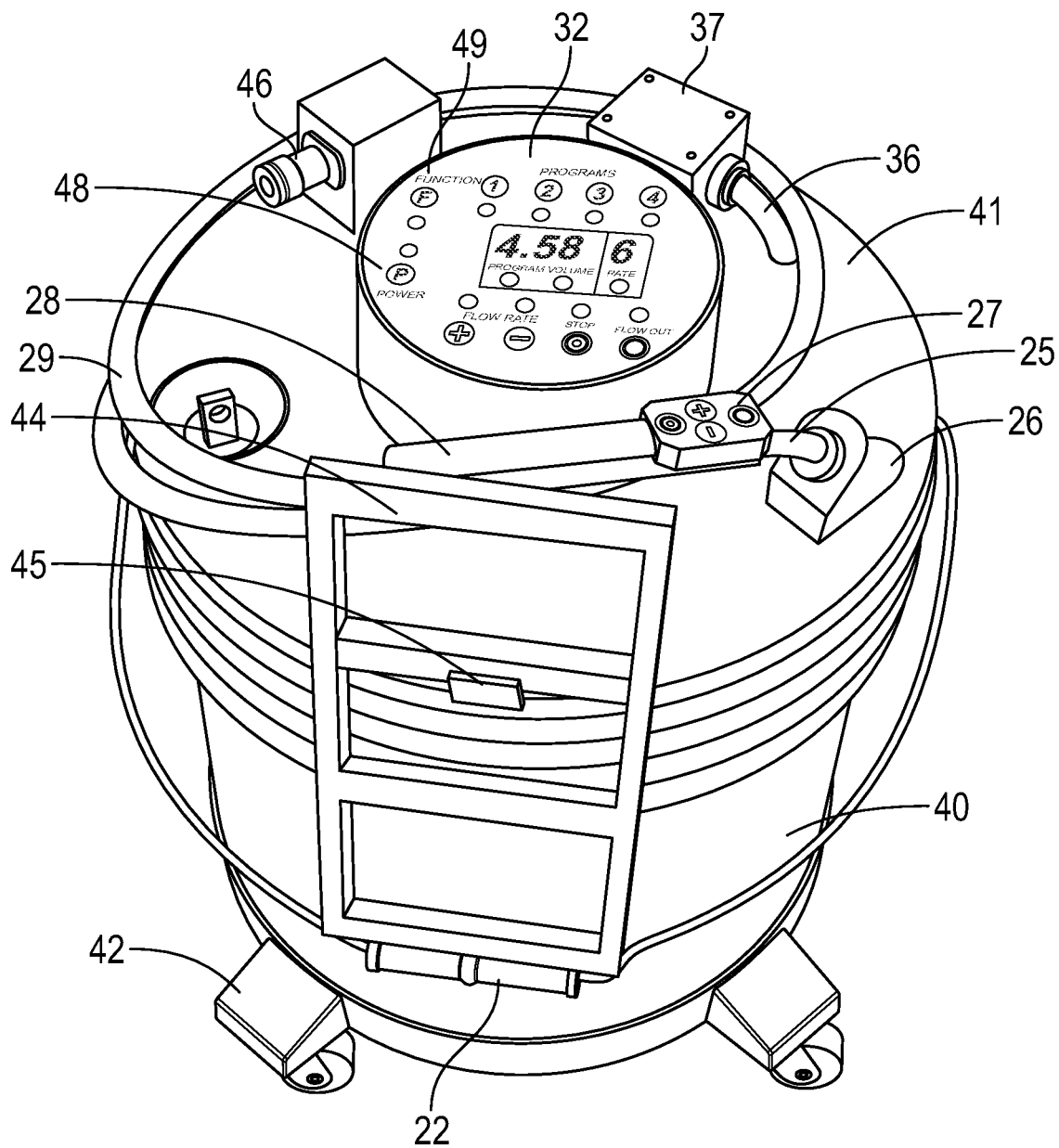
FIGS. 10 to 13 depict an alternative embodiment of the invention.
Figure 11:
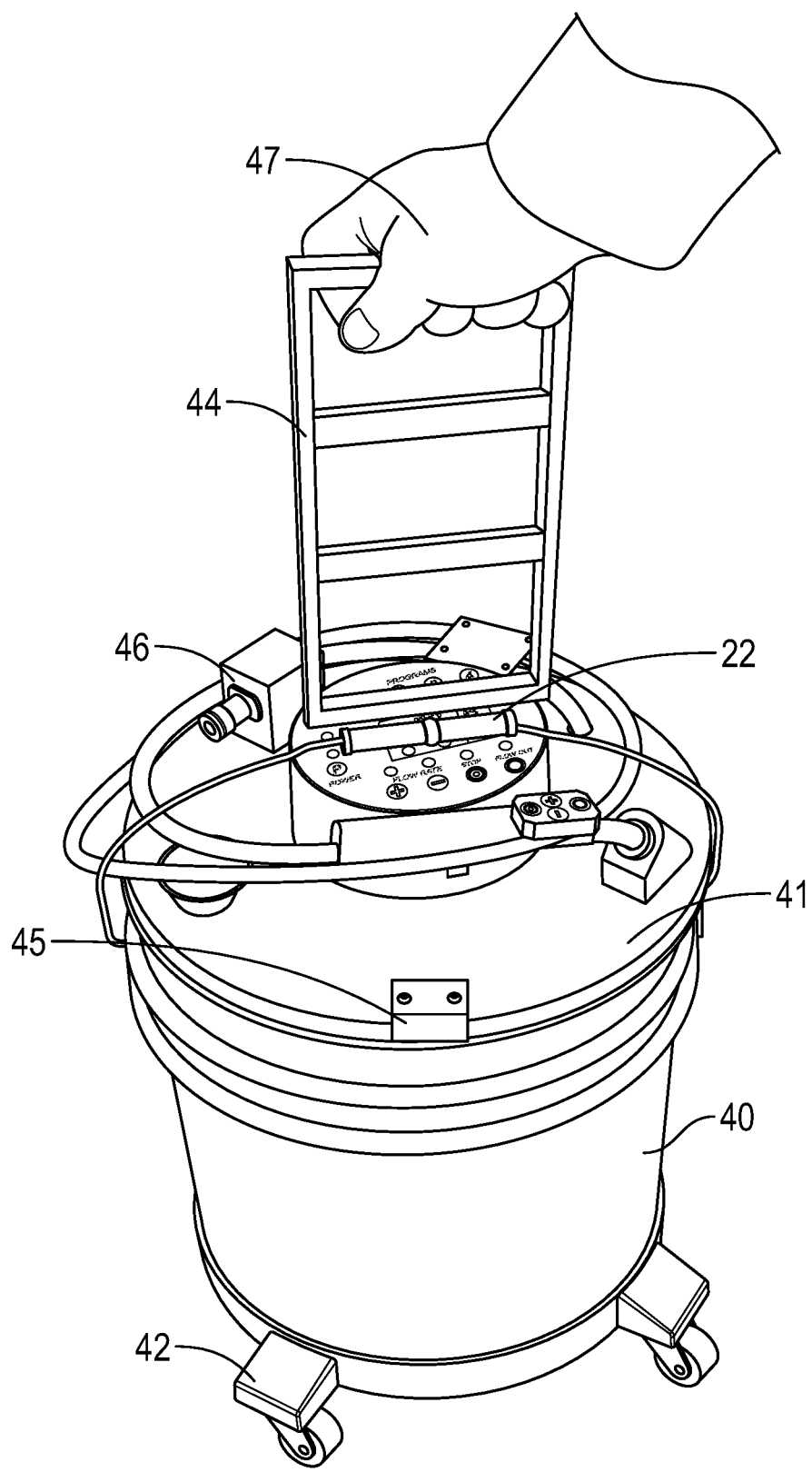
Figure 12:
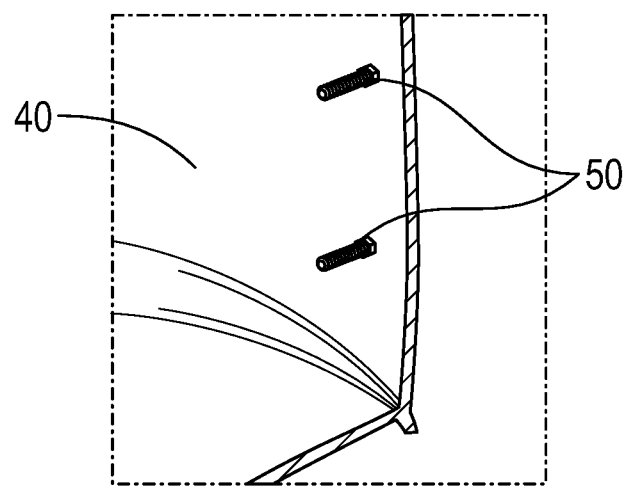
Figure 13:
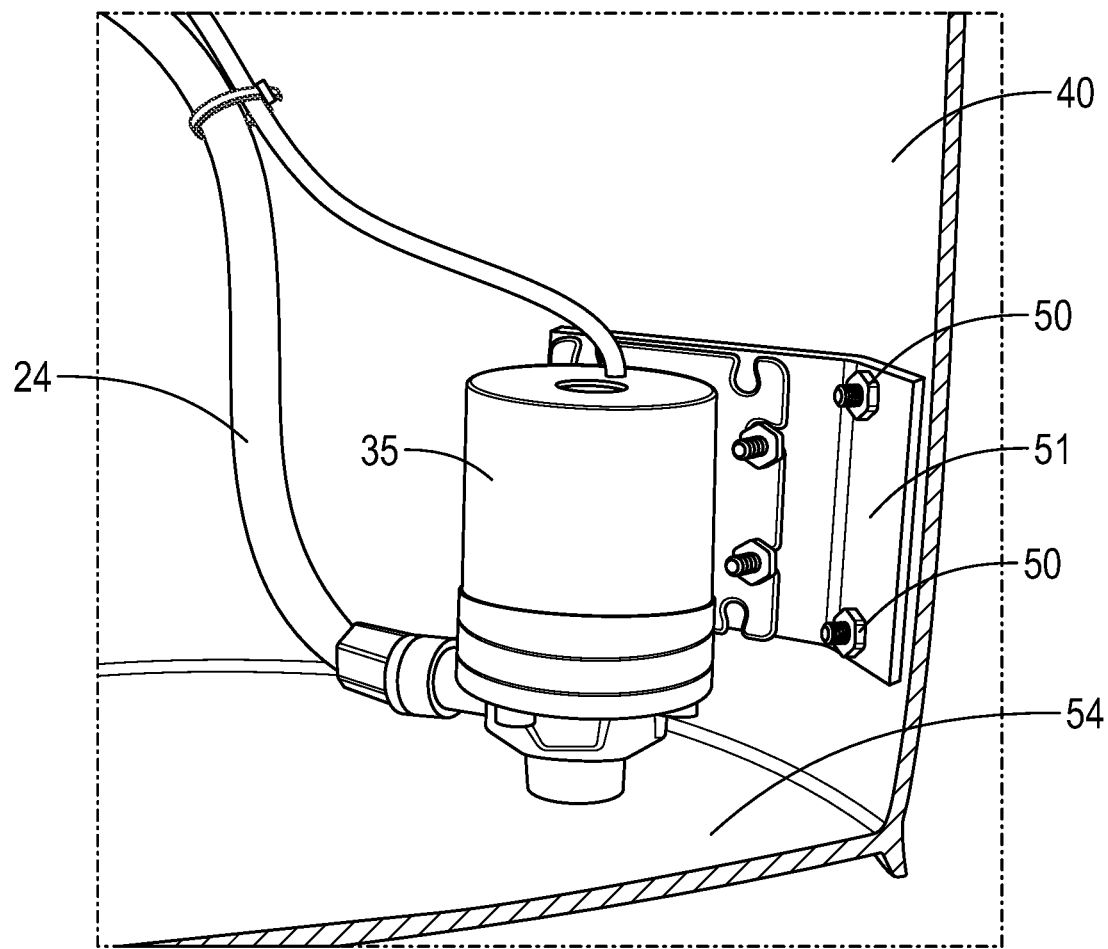

As discussed above, the Gergek Waterer is shown with the pump attached to the bracket and suspended from the cover (FIG. 5). In the second case Gergek Waterer Pro the pump is attached to wall of the bucket (FIG. 12 and FIG. 13). Since the sediments would not be acceptable in unit with drinkable water the pump is placed outside of bucket in a bay with a cover as shown on FIG. 14 and FIG. 15. The same modified bucket could be used for Gergek Waterer and Gergek Waterer Pro.

Automatic Embodiment

In yet another embodiment, several functions are automated. In this embodiment, either a full sized or a small portable unit with opening on the top for manual fill up, that would fit into kitchen or laundry sink for watering houseplants in homes, offices has several automatic features. This embodiment is referred to as the Gergek Auto Waterer.

Figure 16:
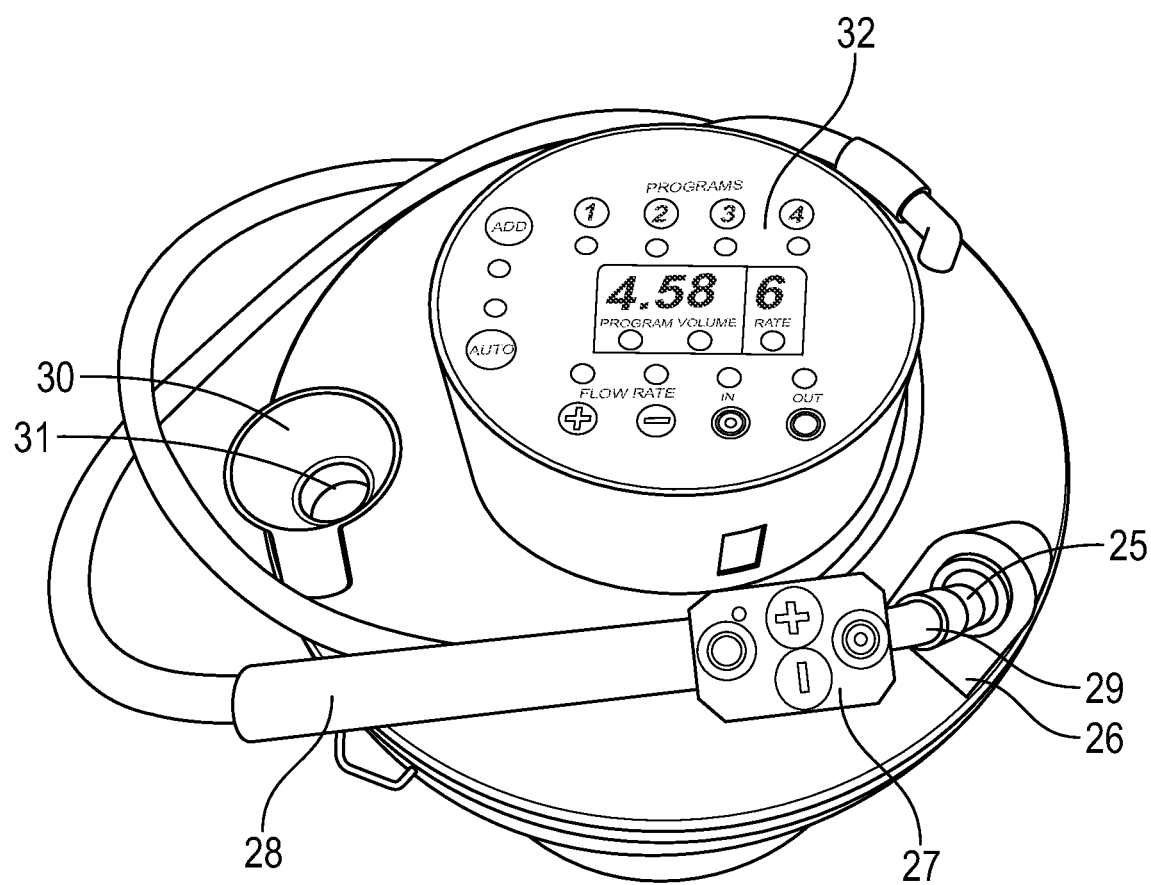
Figure 17:
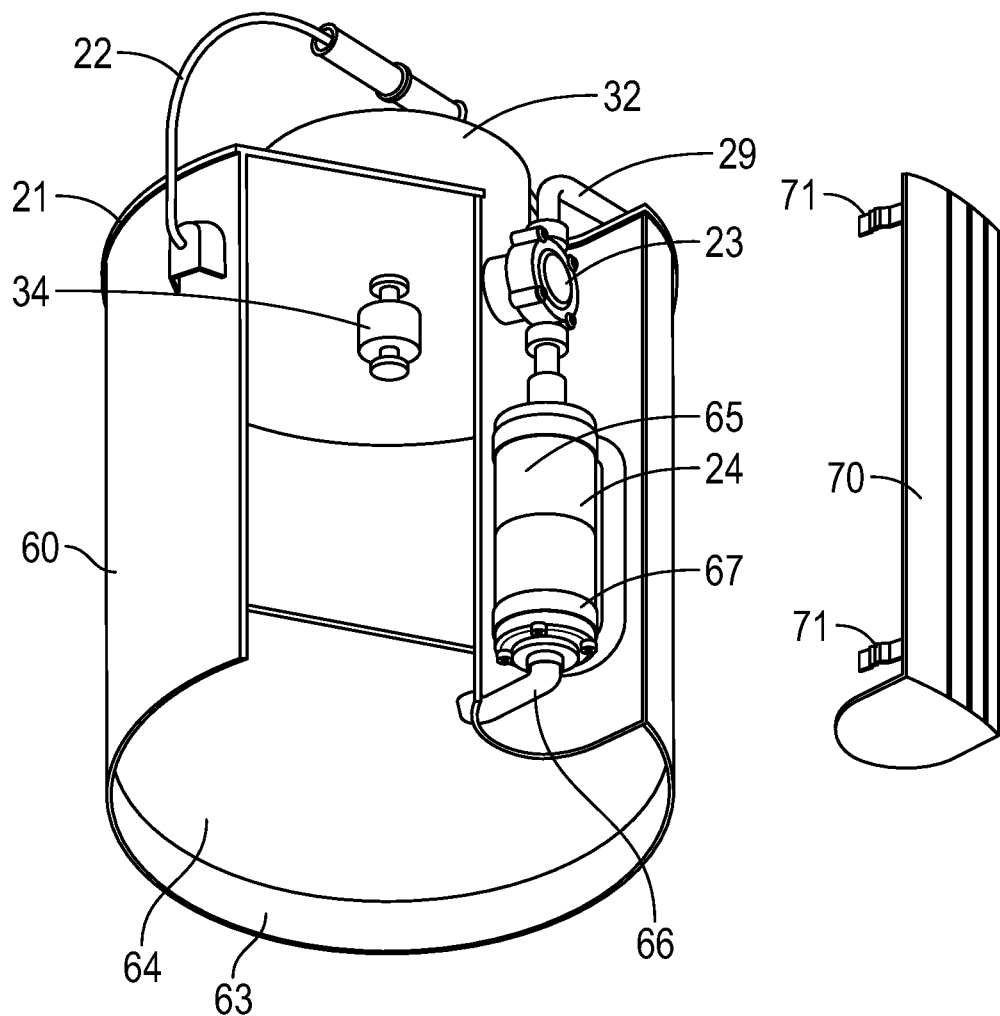
Figure 18:
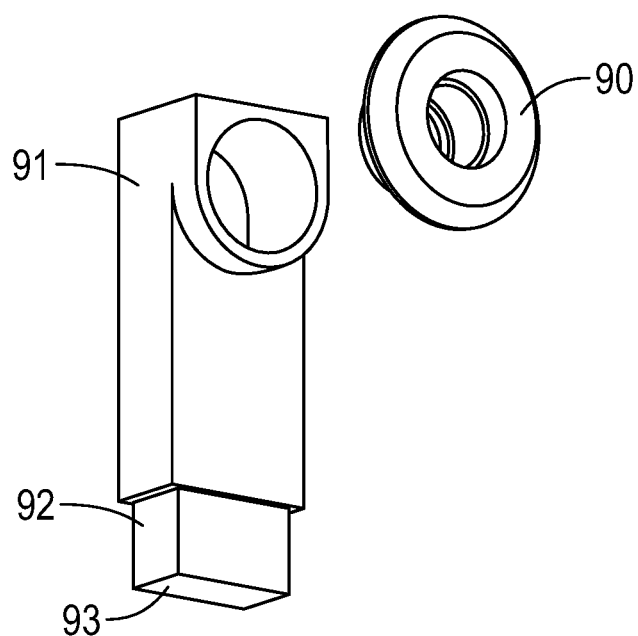
FIGS. 18 to 21 depict details of a quick connect element of an embodiment of the invention.
Figure 19:
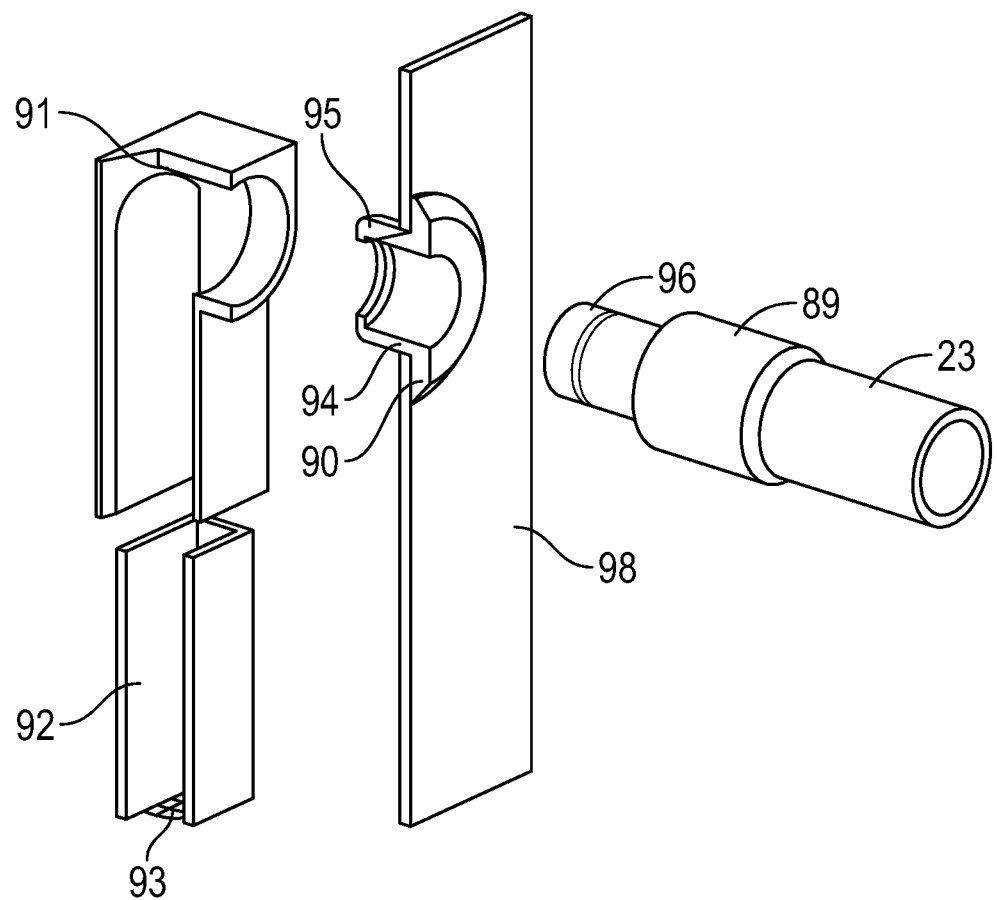
Figure 20:
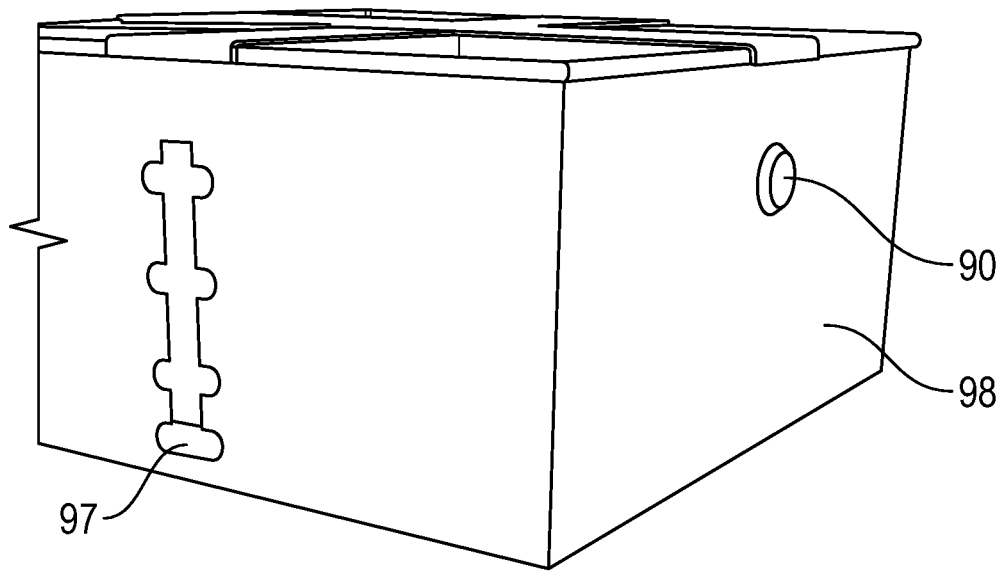
Figure 21:
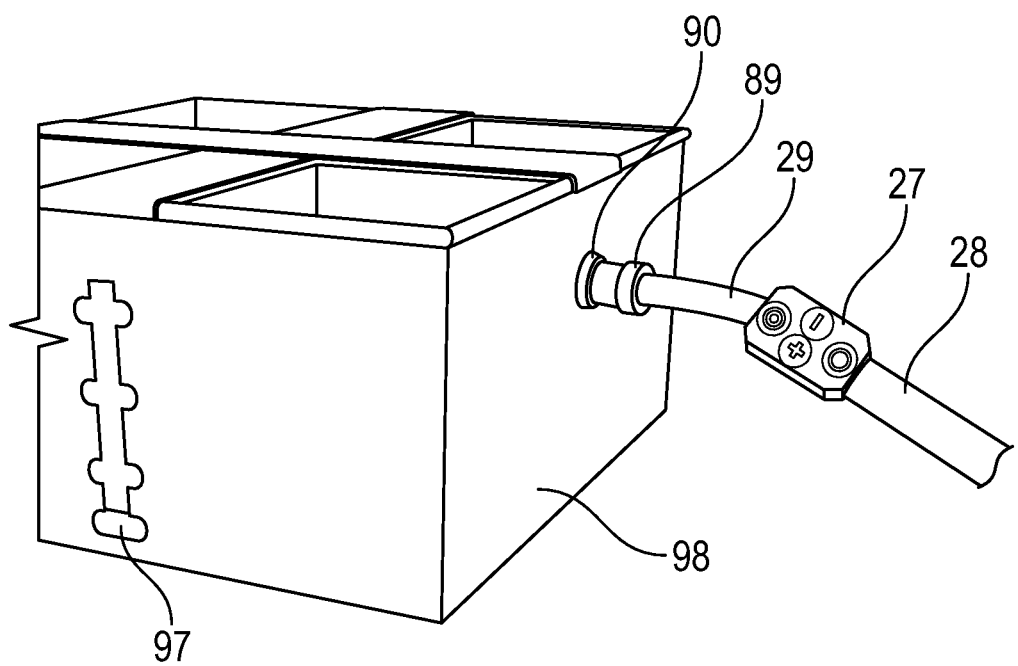

The parts of the Gergek Auto Waterer and Gergek Auto Waterer Pro are shown in FIGS. 15 and 16. The elements include a smaller bucket 20, a cover 21, a carrying handle 22. On the water side, a flow meter 23 and a hose from pump output to flow meter 24, a low pressure valve 25, a recycling adaptor 26. Also included is a remote control 27, a watering handle 28, a watering hose 29, a funnel 30, a plug 31; a control enclosure 32, a recycling switch/sensor 33 a water level switch 34 a pump 35 and a pump mounting bracket 36.

This unit is analogous to Gergek Waterer and Gergek Water Pro described above with few changes. A second pump is installed in the bucket. The outputs of the two pumps are connected together and the intake of second pump is connected to flow meter. At the end of the hose two way low pressure valve is installed. The control panel has few changes. STOP button has been changed to IN button (to suck water INTO bucket). Both OUT and IN controls work the same way. If button is pressed momentarily (less then ½ seconds) the flow stays on continuously. While flow is ON using UP or DOWN buttons will increase or decrease the flow. The single one digit number is shown representing the OUT or IN flow rates. The button has to be pressed second time and then released to stop the flow. Pressing and holding OUT or IN buttons (longer than 1 second) does not latch the flow and it is terminated when button is released.

In operation, this embodiment will have four pushbuttons +, −, OFF, ON. The new unit has following pushbuttons +, −, IN, OUT. Function of OUT button is the same as ON button indicating that this activates flow out of the bucket. Function of IN button is to activate flow through the hose into the bucket.

On main display there will be one additional button called AUTO. If AUTO if turned on then if the IN button is pressed the controller will try to fill the bucket up to the float switch. For example if you put a cup into sink and place the end of watering hose at the bottom of it then once the IN is pressed the controller will first activate the first pump for about 2 seconds to fill the hose. Afterwards it will engage the second pump and will continuously monitor the flow meter. If the flow meter indicates no flow then the controller will go into dormant state for say 20 seconds. After delay it will repeat the same sequence. The controller can also automatically adjust the return flow rate in order to synchronize the removing water from the cup to the flow of water into the cup.

The second application of AUTO feature is to automatically fill up a vessel (flowerpot, flower box, vase, dish, etc.). In this case the hose has to be fixed to the vessel not to move around. If AUTO is turned on, then by pressing OUT button the controller will start the sequence to fill the vessel up to the end of the hose. Instead of turning on first pump continuously the controller will send water in packets e.g. 0.5 Liters. After every packet it will reverse the flow for example for 1 second and will record the amount of water that was returned. If the end of the hose was submerged this amount would be larger than if it was not submerged. The controller would now make then decision whether to send another packet of water or continue sucking water back for e.g. two seconds then activate the buzzer announcing that task has been completed.

Quick Attach Connector for Use with Automated Embodiment

Turning to FIGS. 18 to 21, described therein is a simple quick attach connector for use with an automated embodiment. The parts in this embodiment include the remote control 27, the watering handle 28, the watering hose 29. A two way low pressure valve 89 with a grommet 90 and a quick attach tube 91 with a tube extension 92. Also included are a mesh 93, a ridge 94, a second ridge 95, a back stop 96, a groove 97 and a water-level indicator 98. The system is designed to operate with a planter such as a flower box.

By developing the programmable bucket very useful products have been developed. The Gergek Auto Waterer can fill the flower box or flowerpots up to certain level without need any sensors inside of flowerbox or flowerpot. However still missing was a simple, inexpensive, practical quick attach connector that would last for many years without breaking. Quick attach connectors that were introduced in inventors previous patents lack simplicity and durability. The latest design evolved out of attempt to secure end of watering hose to the wall of flower box. It was planned for quite some time to have a hole on flowerbox at the level of maximum allowed water level and have a valve installed in it. By making the grommet that extend into a tube inside of the flowerbox the actual position of the hole can be significantly higher the maximum allowed water level. There are potential benefits of this design change. If the ordinary Gergek Waterer is used and the operator stops the flow bellow the position of the grommet there would be no water on inside of grommet to create a spill when the end of watering hose is pulled out. The tube extension can also have perforated bottom to prevent dirt getting into the bucket if Gergek Auto Waterer is used. The grommet 90, end of low pressure valve 89, ridge 4 and groove 96 should be manufactured with tolerances so that only small force is needed to insert the end of watering hose into the grommet.

From the low pressure valve 89 to the bottom of the extension tube 92 there is any obstruction that would cause water pressure.

Self-Propelled Unit

The details of a self-propelled machine which includes that could take care of houseplants fully or semi-automatically is beyond the scope of this disclosure. However, it can be appreciated that the programmable bucket embodiments can be incorporated to be moved by a machine capable of carrying out complex actions.

The unit should be in form of programmable bucket with tracks or other wheels capable of movement with propulsion, with speed and direction control similar to robotic vacuum cleaners. The hose with quick attach connector and low pressure valve is installed at the end of robotic arm with vision system. At certain intervals (like every third week) the system will wake up attaches itself to water supply fills up the holding tank. It would move around the home to position itself on preprogrammed locations using indoor GPS system. It would then extend the arm with preprogrammed moves to bring the end of the arm close to the flowerpot with installed connector. With use vision system it will find the quick attach connectors. It will attach itself to the flowerpot, then it will activate AUTOMATIC fill up. Once finished it would disconnect itself from the flowerpot and moves to next one. If there is an obstacle like stars it will position itself at the top (or bottom) then it will send a message via-wi-fi that needs help. The whole unit should small and light so it could be lifted by normal person.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. A method of watering plants using a programmable bucket comprising:

providing a programmable bucket having:

a reservoir for water having an interior defined by sidewalls and a bottom and a cover having an opening adapted to facilitate filling of the reservoir;

a pump;

at least one minimum pressure valve;

a control enclosure;

a water level switch;

a flow meter;

a watering hose;

turning on power to the control enclosure;

providing water to the reservoir, thereby activating the water level switch, in turn activating a buzzer by the control enclosure, and stopping flow of the water into reservoir, while setting an amount of water to a calibrated value and displaying the amount of water on the control enclosure;

removing the watering hose from a recycling adaptor, activating the pump using the control enclosure whereby water fills the watering hose, once it reaches a minimum pressure valve water exits the watering hose under pressure, wherein the recycling adaptor has an opening at one end in communication with the interior of the reservoir;

stopping the pump by using the control enclosure, wherein the watering hose is full of water but water does not exit the watering hose, until a dispensing end of the watering hose is dropped below a certain level first removing the dispensing end of the watering hose from the recycling adaptor which prevents spilling;

wherein if the pump is activated with the dispensing end of the watering hose in recycling adaptor, water re-enters the reservoir through the opening at one end of recycling adaptor, signal from flow meter is ignored and reported volume in the reservoir does not change;

dispensing water by entering into the control enclosure a watering program the amount of water removing the watering hose from the recycling adaptor, a programmed amount of water exits the watering hose due to the pump being started then stopped by the control enclosure watering program; and stopping watering by placing an end of the watering hose into the said recycling adaptor and thereby closing the recycling adaptor opening.

2. The method of watering plants using a programmable bucket of claim 1 wherein providing water to the reservoir is performed by connecting a hose or faucet to the opening in the cover having the funnel introduced in the opening.

3. A programmable bucket comprising:

a reservoir for water having sidewalls and a bottom;

a pump;

at least one minimum pressure valve;

a control enclosure having a buzzer and control buttons;

a water level switch which is adapted to activate the buzzer in the control enclosure;

a flow meter;

a watering hose adapted to be removably received by a recycling adaptor and wherein a rate of water exiting the watering hose is controlled by the control enclosure and flow meter;

a cover with an opening adapted to facilitate filling of the reservoir with a funnel and a removable plug.

4. The programmable bucket of claim 3, wherein said recycling adaptor prevents spilling of content of reservoir when the programmable bucket is tipped.

5. The programmable bucket of claim 3 further comprising a carrying handle and an overflow guide.

6. The programmable bucket of claim 3, wherein said at least one minimum pressure valve is a one-way minimum low-pressure valve.

7. The programmable bucket of claim 3, wherein said at least one minimum pressure valve allows for water flow to occur if pressure is above a threshold value.

8. The programmable bucket of claim 3, wherein said control enclosure holds a control circuit wherein said control circuit is programmable and displays information about water level in the reservoir.

9. The programmable bucket of claim 3 further comprising a remote control.

10. The programmable bucket of claim 3, wherein said reservoir comprises a bucket.

11. The programmable bucket of claim 10, wherein said bucket is adapted to fit under a faucet in a standard sink.

12. A programmable bucket system comprising:
a reservoir for water having sidewalls and a bottom;
a pump held in place by a bracket;
at least one minimum pressure valve;
a control enclosure;
a water level switch;
a flow meter;
a watering hose;
at least one caster, and
a cover;
wherein the reservoir receives water through a quick attach connector;
wherein the water level switch sets a water amount to a calibrated value;
wherein the flow meter provides feedback to the control enclosure, which controls the pump which pumps water through each minimum pressure valve to the watering hose.

13. The programmable bucket system of claim 12, wherein the quick attach connector comprises a quick attach tube, extension, and a grommet.

14. The programmable bucket system of claim 12, wherein said at least one caster comprises a set of four caster wheels.

15. The programmable bucket system of claim 12 further comprising a solar-powered cooling system for contents of the reservoir and a layer of insulation on the reservoir.

16. The programmable bucket system of claim 12 further comprising a handle to pull and direct the reservoir.

17. The programmable bucket system of claim 12 further comprising a recycling adaptor to prevent spillage.

18. The programmable bucket system of claim 12 further comprising a minimum pressure valve, which is a two way minimum pressure valve.

19. The programmable bucket system of claim 12, wherein said reservoir is self-propelled.

20. The programmable bucket system of claim 12 further comprising a second pump connected in series with first pump but opposite direction to refill the reservoir.

21. The programmable bucket system of claim 20, wherein the control enclosure dispenses preset quantities of water through the watering hose, then engages the second pump to determine if the watering hose is submerged.

* * * * *